(No Model.)  3 Sheets—Sheet 1.
W. A. VAN DEUSEN.
SILO.
No. 546,204. Patented Sept. 10, 1895.
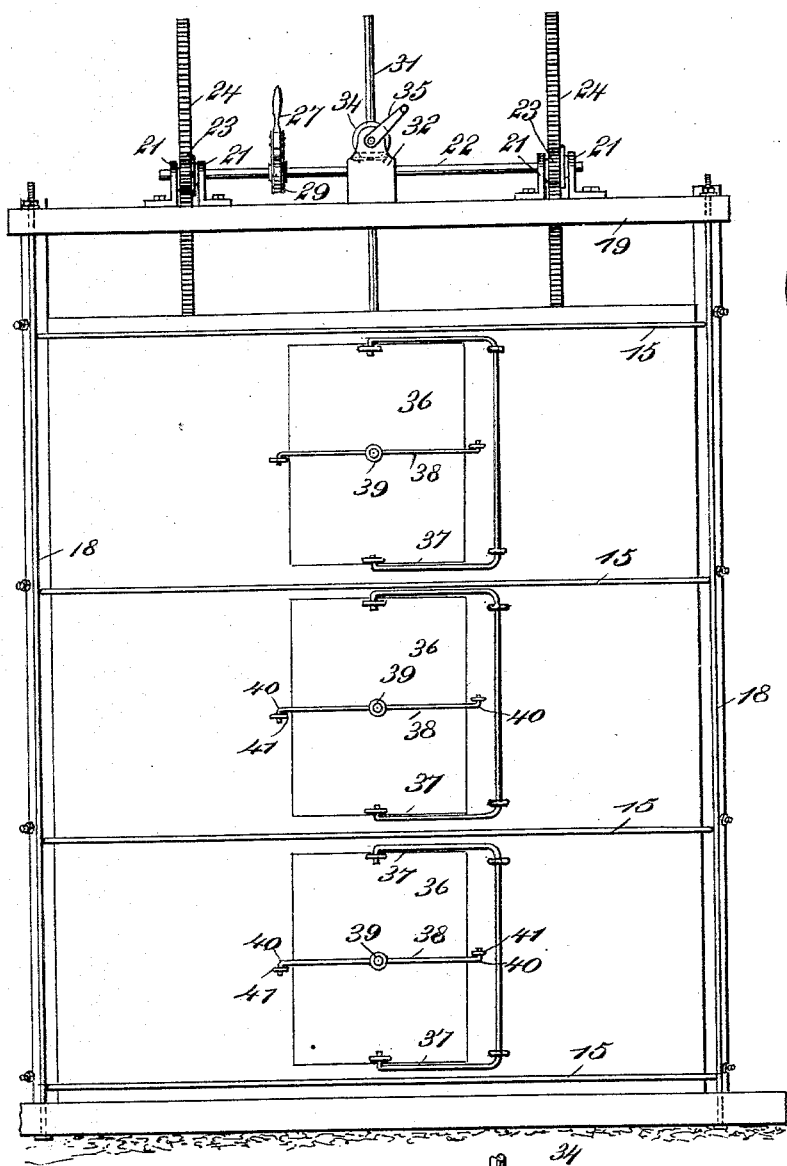
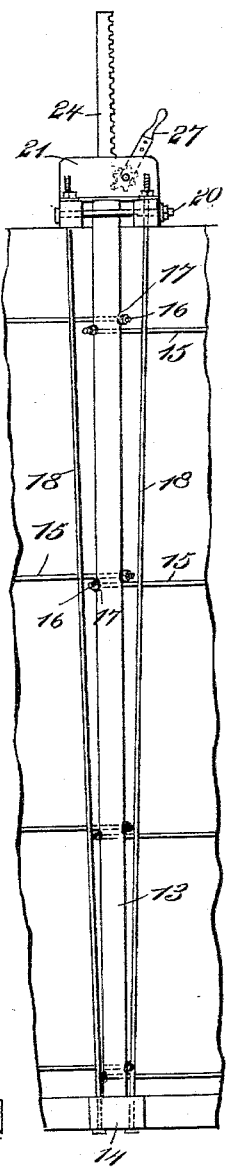
WITNESSES:
INVENTOR
W. A. Van Deusen
BY
Munn & Co.
ATTORNEYS.

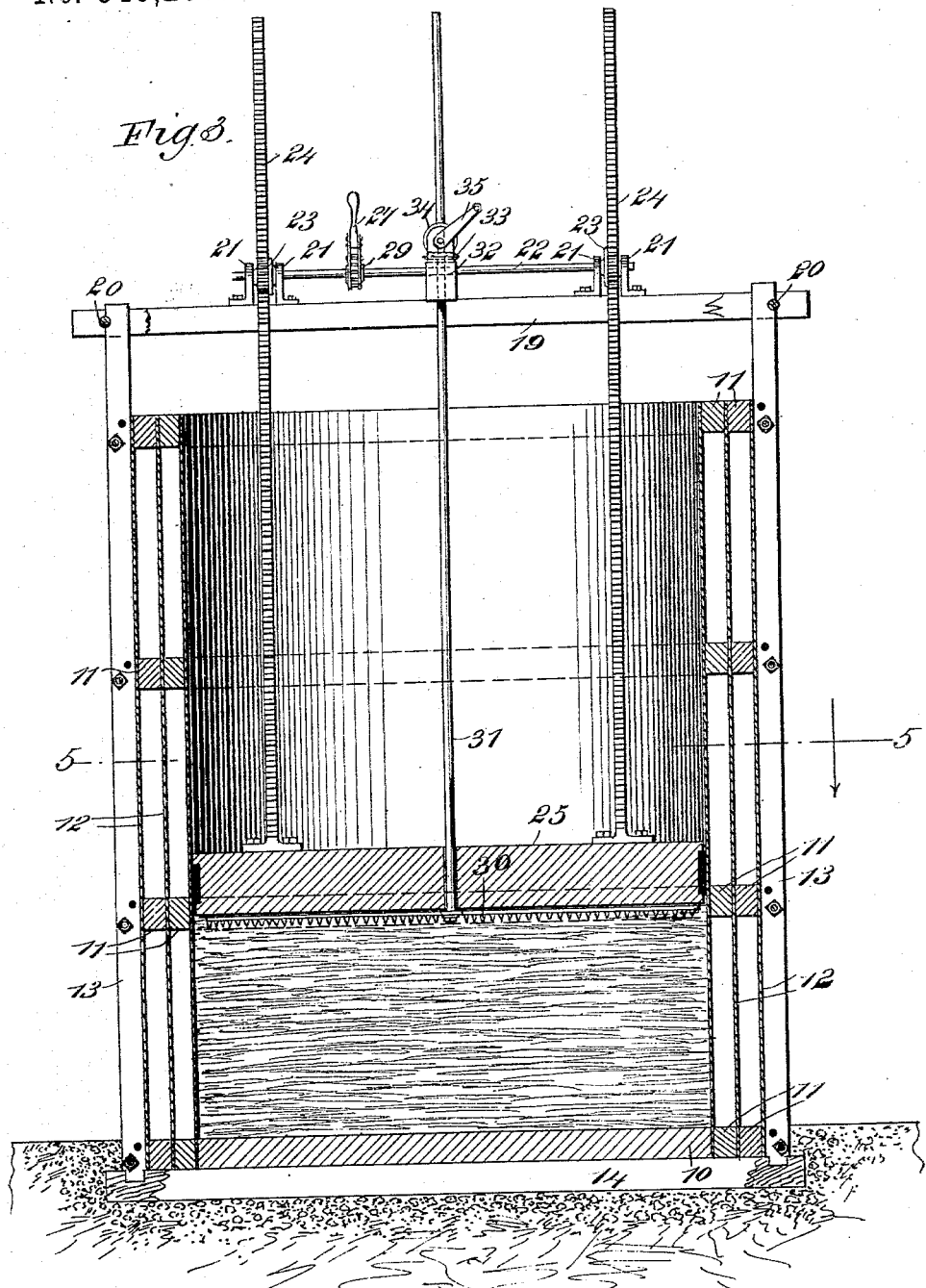

(No Model.) 3 Sheets—Sheet 3.

W. A. VAN DEUSEN.
SILO.

No. 546,204. Patented Sept. 10, 1895.

WITNESSES:
Paul Johst
H. B. Hutchinson

INVENTOR
W. A. Van Deusen
BY Munn & Co.
ATTORNEYS.

UNITED STATES PATENT OFFICE.

WILLIAM A. VAN DEUSEN, OF SPROUT BROOK, NEW YORK.

SILO.

SPECIFICATION forming part of Letters Patent No. 546,204, dated September 10, 1895.

Application filed January 23, 1895. Serial No. 535,868. (No model.)

*To all whom it may concern:*

Be it known that I, WILLIAM A. VAN DEUSEN, of Sprout Brook, in the county of Montgomery and State of New York, have invented a new and Improved Silo, of which the following is a full, clear, and exact description.

My invention relates to improvements in silos. As these are generally arranged the fodder to be preserved is thrown into the silo and trodden down as solidly as possible, after which weights are placed on the top of the fodder to compress it and keep out the air, and when it is necessary to use the fodder the covering has to be removed, thus exposing the ensilage to the injurious action of the air.

The object of my invention is to obviate these difficulties and produce a simple airtight silo, which is provided with a piston adapted to thoroughly compress the ensilage, which has a convenient lever and gear mechanism for working the piston, which has a simple form of rake to keep the ensilage level, which has a convenient system of doors by which the ensilage may be removed from the silo with as little exposure to the remaining ensilage as possible, and which in general is adapted to greatly facilitate the perfect preservation and handling of the ensilage.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 4:
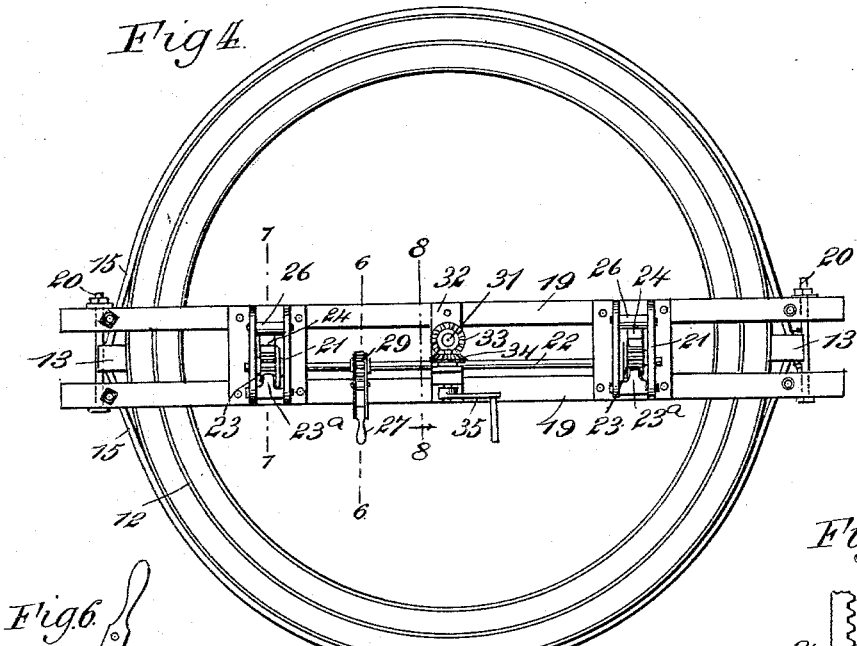
Figure 6:
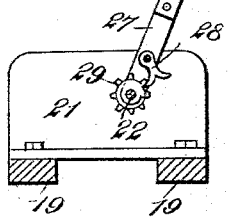
Figure 5:
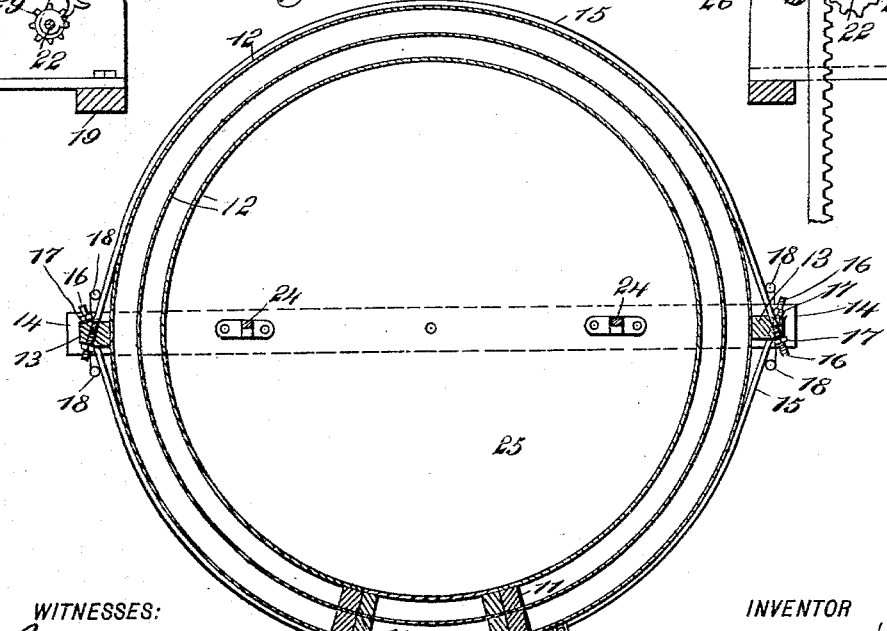
Figure 7:
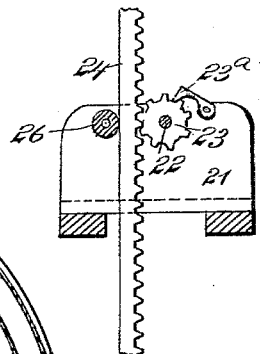

Figure 1 is a front elevation of my improved silo. Fig. 2 is a broken rear elevation of the same. Fig. 3 is a vertical cross-section of the silo. Fig. 4 is a plan view thereof. Fig. 5 is a sectional plan on the line 5 5 of Fig. 3. Fig. 6 is a detail cross-section on the line 6 6 of Fig. 4. Fig. 7 is a detail cross-section on the line 7 7 of Fig. 4, and Fig. 8 is a broken detail section on the line 8 8 of Fig. 4.

The silo is provided with a suitable floor 10, which is preferably of wood, and is held in a concrete bed, and the silo is preferably circular in cross-section and has suitable segmental ribs 11, which may be supported by any desired form of studding and which carry the walls 12 of the silo, these walls being preferably of paper, although other material may be used. The walls are concentric and are spaced to form air-spaces between them, in order that the silo may be made perfectly airtight. To prevent the walls from being punctured, the outer and inner sides may be lined with metal or protected in any suitable way.

The walls of the silo are stiffened by the posts 13, which are arranged on diametrically-opposite sides of the silo and project above its top, these posts being at their lower ends secured to a sill, which is embedded in the concrete or otherwise fastened beneath the floor 10. The silo is also stiffened by hoops 15, which extend around it, and the ends of the hoops extend through the posts 13 and are screw-threaded, as shown at 16, and provided with nuts 17, so that the hoops may be tightened to any desired extent and the walls of the silo made very strong. On the sides of the posts 13 are brace-rods 18, which extend to the tops of the posts and are secured at the bottom to the sills 14, these brace-rods supporting the parallel cross-bars 19, which extend above the top of the silo and carry the mechanism for operating the piston and leveling-rake. These cross-bars 19 are connected by bolts 20, and they carry hangers or brackets 21, in which is journaled the driving-shaft 22, which has pinions 23, meshing with the vertical rack-bars 24, which are secured to and operate the piston 25. The pinions 23 are provided with pawls 23$^a$, by which they may be fastened, and the rack-bars are held in contact with the pinions by guide-rollers 26, which are journaled between the hangers 21, as shown best in Fig. 7.

The shaft 22 is worked by means of a lever 27, which may be of any desired length, according to the size of the silo and the necessary power to work the piston, this lever being pivoted on the shaft and provided with a double pawl 28, adapted to engage a pinion 29, which is fixed to the shaft, (see Fig. 5,) and thus by working the lever up and down the pinion and shaft may be turned, so that the pinions 23, acting on the rack-bars 24, will raise or lower the piston 25, while by tipping over the pawl 28, the direction of the shaft and piston may be reversed.

In order that the ensilage may be kept level as the piston descends, a revoluble rake 30 is arranged on the under side of the piston, this rake having a shaft 31, which extends upward through the piston and through a support 32 on the cross-bars 19. The shaft is provided with a pinion 33, through which it slides, the pinion being keyed to the shaft in the usual way, and this pinion meshes with a second pinion 34, which is provided with a crank 35, so that by turning the crank the motion is transmitted to the shaft and rake.

To provide for easily removing the ensilage the silo is provided with a series of doors 36, arranged one above the other, and these are double-walled like the rest of the silo, and they are each pivotally connected to a bail 37, which is journaled on the side of the silo, although any other suitable hinge may be used. The form of the hinge shown, however, is especially adapted to the thick doors, as it enables the doors to have the necessary outward movement before swinging, thus preventing them from binding.

The doors may be fastened in any convenient way, a suitable fastening being illustrated in Fig. 1, which shows each door provided with a cross-bar 38, which is pivoted in the center, as shown at 39, and has oppositely-bent ends 40, adapted to engage staples 41 on opposite sides of the door. These doors, besides being adapted for removing the ensilage, may be used, if desired, for inserting the same beneath the piston 25.

When the silo is to be filled the piston is raised, a quantity of fodder to be converted into ensilage is placed in the silo, and the lever 27 is worked, so as to turn the shaft 22 and pinions 23, thus forcing down the rack-bars 24 and the piston 25, which presses the ensilage downward, the rake 30 being meanwhile revolved by the shaft 31, crank-handle 35, and the gears connecting the shaft and handle, so that the ensilage is kept level and the piston made to bear evenly upon it. This operation is repeated until the silo is filled to the desired extent, and if it is desired to keep on the pressure a heavy weight is hung on the lever 27.

When the ensilage is to be used, the upper door 36 is first opened, if the silo is full, and when the ensilage reaches the level of the second door, this may be used for reaching the ensilage, and so on until the silo is emptied, the doors being successively used as the level of the ensilage descends.

It will be seen that the silo may be very easily constructed and that it may be made very strong by tightening the hoops 15, and that these hoops may be easily adjusted to suit silos of different diameters.

Having thus described my invention, I claim as new and desire to secure by Letters Patent—

1. A silo having double walls, hoops to strengthen the walls, a piston reciprocating within the silo and a revoluble rake arranged on the under side of the piston, substantially as described.

2. The combination with a silo provided with a series of doors arranged one above the other for the removal and insertion of the ensilage, of the reciprocating piston within the silo, and the revoluble rake arranged on the under side of the piston to keep the ensilage level, substantially as described.

3. The combination with the silo having the reciprocating piston and the revoluble rake arranged on the under side of the piston, of the cross bars arranged above the top of the silo, the driving shaft on the cross bars, and a gear connection between the driving shaft and piston, substantially as described.

4. The combination with the silo and the reciprocating piston therein, of the revoluble rake arranged on the under side of the piston, to keep the ensilage level, substantially as described.

5. The combination with the silo and the reciprocating piston therein, of the revoluble rake arranged on the under side of the piston to keep the ensilage level, the shaft secured to the rake and extending upward through the piston and a crank and gear mechanism for turning the shaft, substantially as described.

6. The combination with the silo, and the reciprocating piston, of the cross bars arranged above the top of the silo, a support carried by said cross bars, a rake provided with a shaft extending upward through the piston and the said support, a pinion keyed to the rake shaft and through which the said shaft is adapted to slide, and a second pinion meshing with the first pinion and provided with a crank, substantially as described.

WILLIAM A. VAN DEUSEN.

Witnesses:
 LEON S. FARLEY,
 E. T. VAN DEUSEN.